US012775974B2

(12) United States Patent
Kim et al.

(10) Patent No.: US 12,775,974 B2
(45) Date of Patent: Oct. 27, 2026

(54) SYSTEM AND METHOD FOR PROVIDING INFORMATION

(71) Applicants: HYUNDAI MOTOR COMPANY, Seoul (KR); KIA CORPORATION, Seoul (KR)

(72) Inventors: La Woo Kim, Seoul (KR); Han Shik Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 111 days.

(21) Appl. No.: 18/610,762

(22) Filed: Mar. 20, 2024

(65) Prior Publication Data

US 2025/0148521 A1 May 8, 2025

(30) Foreign Application Priority Data

Nov. 6, 2023 (KR) ........................ 10-2023-0151857

(51) Int. Cl.
*G06Q 30/00* (2023.01)
*G06Q 30/0601* (2023.01)

(52) U.S. Cl.
CPC ................................ *G06Q 30/0631* (2013.01)

(58) Field of Classification Search
CPC .................................................. G06Q 30/0631
See application file for complete search history.

(56) References Cited

U.S. PATENT DOCUMENTS

2010/0262469 A1* 10/2010 Fein .................... G06Q 30/0255 340/425.5
2021/0272188 A1* 9/2021 Kobayashi ............. G06Q 30/02
2022/0405725 A1* 12/2022 Grossman .............. G06Q 30/06

OTHER PUBLICATIONS

P. Voland, “Spatio-Temporal visualization of automotive sensor data—A conceptual and implementational framework,” 2017 IEEE Region 10 Symposium (TENSYMP), Cochin, India, 2017, pp. 1-5. (Year: 2017).*

* cited by examiner

*Primary Examiner* — Anand Loharikar
(74) *Attorney, Agent, or Firm* — Lempia Summerfield Katz LLC

(57) ABSTRACT

A system for providing information includes a controller that may determine a car washing pattern based on car washing performance information of a vehicle and weather information. The controller may also determine an estimated time when a next car washing will be performed based on the car washing pattern. The controller may provide information of interest on at least one car washing place to be displayed when the determined estimated time is reached. The system may also include an output device that displays the information of interest.

10 Claims, 3 Drawing Sheets

SYSTEM AND METHOD FOR PROVIDING INFORMATION

CROSS REFERENCE TO RELATED APPLICATION

The present application claims the benefit of and priority to Korean Patent Application No. 10-2023-0151857, filed on Nov. 6, 2023, the entire contents of which are incorporated herein by reference.

TECHNICAL FIELD

The present disclosure relates to a system and method for providing specific information to a vehicle user.

BACKGROUND

Using data received from a Global Positioning System (GPS) satellite, a conventional navigation system mounted on a vehicle shows the vehicle's current location and traveling direction through a display device. Further, when a departure and a destination are input, the conventional navigation system may display a route, distance, and estimated time that the vehicle is to travel on the screen.

In addition, the navigation system may preset the optimal distance or road priority using the traffic information received from a real-time traffic information system, the vehicle's current location, and the map information stored internally. The navigation system may then provide a service that gives information on the searched routes based on the preset information when a user searches for a route. The navigation system may provide users not only with route guidance but also with various functions such as radio functions, media functions, and location sharing functions.

The foregoing description of the background technology is intended to provide a better understanding of the background of the present disclosure and should not be taken as a recognition of prior art known to those having ordinary skill in the art.

SUMMARY

As the time a user spends in a vehicle increases, it may be desired to provide functions or services that can increase user convenience using a navigation system. For example, it may be desired to provide advertisements tailored to the user's needs using a navigation system.

Embodiments of the present disclosure provide a system and method for proving information with advertisements tailored to the user's needs by predicting the next task time based on a vehicle user's repeatedly performed task pattern.

The technical problems to be solved by the present disclosure are not limited to the technical problems mentioned above. Other technical problems not mentioned should be clearly understood by those having ordinary skill in the art to which the present disclosure pertains from the following description.

According to an embodiment, a system for providing information is provided. The system includes a controller configured to determine a car washing pattern based on car washing performance information of a vehicle and weather information. The controller is also configured to determine an estimated time when a next car washing will be performed based on the car washing pattern. The controller is further configured to provide information on at least one car washing place to be displayed when the estimated time is reached. The system additionally includes an output device configured to display the information on the at least one car washing place to a user.

In an aspect, the controller may be configured to collect the car washing performance information of the vehicle based on one or both of i) usage information of an in-vehicle payment function provided in the vehicle or ii) sensing information of a rain sensor provided in the vehicle and the weather information.

In an aspect, the controller may be configured to determine that a car washing was performed when the rain sensor collects sensing information for more than a preset reference time when it does not rain according to the weather information.

In an aspect, the controller may be configured to determine the estimated time by combining the determined car washing pattern and the weather information.

In an aspect, the information of interest may include at least one of location information of the at least one car washing place and a discount information of a car washing fee.

In an aspect, the controller may be configured to determine a current location of the vehicle when the estimated time is reached. The controller may further be configured to provide the information of interest corresponding to the current location of the vehicle to be displayed.

In an aspect, the controller may be configured to receive the information of interest corresponding to the current location of the vehicle from an external server. The controller may be configured to provide the received information of interest to be displayed.

In another embodiment, a method for providing information is provided. The method includes determining a car washing pattern based on car washing performance information of a vehicle and weather information. The method also includes determining an estimated time when a next car washing will be performed based on the car washing pattern. The method additionally includes displaying information of interest on at least one car washing place when the determined estimated time is reached.

In an aspect, determining the car washing pattern may include collecting the car washing performance information of the vehicle based on one or both of i) usage information of an in-vehicle payment function provided in a vehicle or ii) sensing information of a rain sensor provided in the vehicle and the weather information.

In an aspect, collecting the car washing performance information may include determining that the car washing was performed when the rain sensor collects the sensing information for more than a preset reference time when it does not rain according to the weather information.

In an aspect, determining the estimated time may include determining the estimated time by combining the determined car washing pattern and the weather information.

In an aspect, the information of interest may include at least one of a location information of the at least one car washing place and a discount information of a car washing fee.

In an aspect, displaying the information of interest may include determining a current location of the vehicle when the estimated time is reached, and displaying the information of interest corresponding to the current location of the vehicle.

In an aspect, displaying the information of interest may include receiving the information of interest corresponding to the current location of the vehicle from an external server, and displaying the received information of interest.

As described above, the system and method for providing information according to embodiments of the present disclosure may provide information and advertisements tailored to the user's needs by determining the car washing pattern and accordingly displaying the information of interest on car washing places at the estimated time.

In addition, the user's usability of the in-vehicle payment function may be improved by determining the car washing pattern based on usage information of the in-vehicle payment function.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Figure 1:
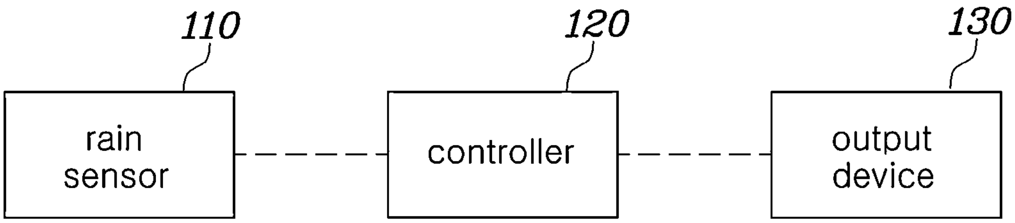
FIG. 1 is a block diagram showing a configuration of a system for providing information, according to an embodiment of the present disclosure.

In describing embodiments of the present disclosure, when it was determined that detailed description of related known technology may obscure the gist of the present disclosure, the detailed description thereof has been omitted. In addition, the accompanying drawings are provided only to enhance understanding of the embodiments s disclosed herein. The technical ideas disclosed herein are not limited by the accompanying drawings and should be understood to include all changes, equivalents or substitutes included in the spirit and technical scope of the present disclosure.

Terms including ordinal numbers, such as first and second, may be used to describe various components, but the components are not limited by the terms. The terms are used only for the purpose of distinguishing one component from another.

When it is stated that a component is "connected" or "linked" to another component, it should be understood that the component may be directly connected or linked to the other component, or one or more intervening components present between the constituent components. On the other hand, when it is stated that one component is "directly connected" or "directly linked" to another component, it should be understood that no other component exists between the constituent components.

Singular expressions include plural expressions unless the context clearly indicates otherwise.

In this specification, terms such as "include" or "have" are intended to specify the existence of features, numbers, steps, actions, components, parts or combinations thereof described in the specification. Such terms should be understood not to preclude the existence or addition of one or more other features or numbers, steps, actions, components, parts or combinations thereof.

Hereinafter, embodiments of the present disclosure are described in detail with reference to the accompanying drawings. In the following description, the same or similar components are designated with the same reference numbers even when the components are displayed on different drawings, and overlapping descriptions thereof have been omitted.

When a component, device, element, or the like of the present disclosure is described as having a purpose or performing an operation, function, or the like, the component, device, or element should be considered herein as being "configured to" meet that purpose or to perform that operation or function.

Embodiments of the present disclosure may predict the next task time a task will be performed based on a repeatedly performed task pattern of a vehicle, and may provide information on the task to a user along with an advertisement tailored to the user's needs. For example, embodiments of the present disclosure described below may assume that the repeatedly performed task is car washing, and may aim to predict the estimated time when car washing will be performed based on the car washing pattern of the vehicle and to provide information on at least one car washing place along with advertisements related to car washing to the user.

A system for providing information, according to an embodiment of the present disclosure, is described in more detail with reference to FIG. 1.

FIG. 1 is a block diagram showing a configuration of a system for providing information, according to an embodiment of the present disclosure.

Referring to FIG. 1, the system for providing information according to an embodiment of the present disclosure may include a rain sensor 110, a controller 120, and an output device 130. FIG. 1 mainly shows components related to the embodiment of the present disclosure. Fewer or more components than the illustrated components may be actually included in the system, in various embodiments.

The rain sensor 110 may be provided on the front windshield of a vehicle. The rain sensor 110 may sense whether it is raining, the amount of rainwater, and the speed of the rainwater. The rain sensor 110 may transmit or otherwise provide the sensed information to the controller 120.

As described in more detail below with reference to FIG. 2, the controller 120 may determine a car washing pattern of the vehicle. Additionally, the controller 120 may determine an estimated time when the next car washing will be performed based on the car washing pattern. Further, the controller may provide information on at least one car washing places to be displayed at the estimated time.

In an embodiment, the controller 120 may be implemented as a function of an Audio/Video/Navigation (AVN) controller that controls an AVN system. However, this is merely an example, and the present disclosure is not limited thereto. For example, the controller 120 may be implemented as a separate controller from the AVN controller or may be implemented with its functions being distributed in two or more different controllers.

Figure 2:
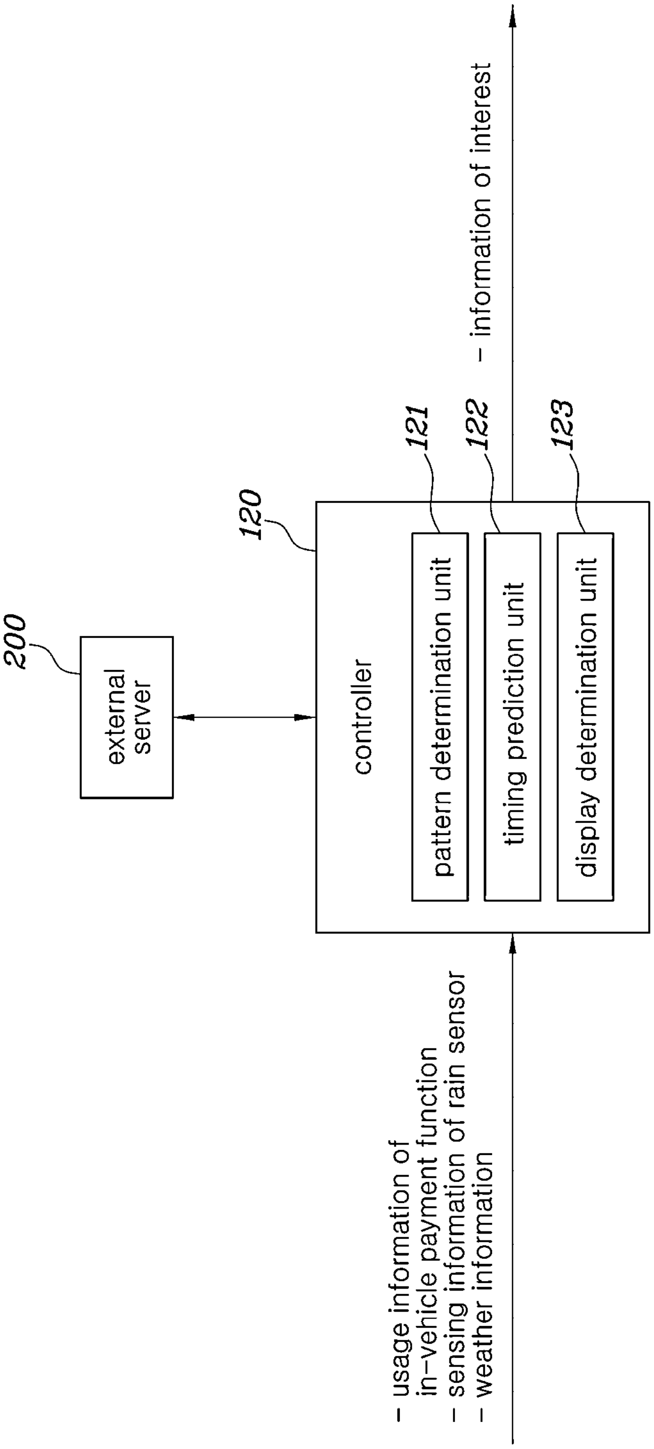
FIG. 2 is a block diagram illustrating operation of a controller, according to an embodiment of the present disclosure.

FIG. 2 is a block diagram illustrating operation of the controller, according to an embodiment of the present disclosure.

Referring to FIG. 2, the controller 120 according to an embodiment of the present disclosure may include a pattern determination unit 121, a timing prediction unit 122, and a display determination unit 123. These components represent components related to the operation of the controller 120 according to embodiments of the present disclosure. However, fewer or more components may be included when the controller is actually implemented.

The pattern determination unit 121 may determine a car washing pattern of the vehicle based on car washing performance information of the vehicle and weather information. To this end, the pattern determination unit 121 may obtain the car washing performance information of the vehicle and the weather information. The weather information may be obtained based on the location of the vehicle. The weather information may include at least one of weather information for a specific time, weather information for a specific period, and/or weather information for a driving destination. However, this is merely an example, and the present disclosure is not limited thereto.

The pattern determination unit 121 may collect car washing performance information based on usage information of an in-vehicle payment function provided in the vehicle and/or based on the sensing information of the rain sensor 110 and the weather information. For example, when the in-vehicle payment function is provided in the vehicle, the pattern determination unit 121 may collect the car washing performance information based on the usage information of the in-vehicle payment function. The in-vehicle payment function may refer to a payment function that allows a user to conveniently pay without a real card at affiliated stores such as gas stations, car washing places, restaurants, and parking lots through a navigation system provided in the vehicle. For example, the in-vehicle payment function provided in the vehicle may be an in-car payment function. However, the in-vehicle payment function is not necessarily limited thereto.

When an in-vehicle payment function is not provided in the vehicle, it may be difficult to clearly determine whether a car washing of the vehicle was performed. Accordingly, the pattern determination unit 121 may collect the car washing performance information based on the sensing information of the rain sensor 110 and the weather information. For example, when the in-vehicle payment function is not provided, the pattern determination unit 121 may determine whether the rain sensor 110 collects sensing information for more than a preset reference time when it does not rain according to the weather information. When the rain sensor 110 collects the sensing information for more than a preset reference time when it does not rain according to the weather information, the pattern determination unit 121 may determine that a car washing of the vehicle was performed. Accordingly, the pattern determination unit 121 may determine whether a car washing was performed based on the sensing information of the rain sensor 110 and the weather information. The pattern determination unit 121 may thus collect car washing performance information, including whether a car washing of the vehicle was performed. However, this is merely an example and the present disclosure is not limited thereto.

When the car washing performance information is collected, the pattern determination unit 121 may determine the car washing pattern of the vehicle by combining the determined car washing performance information and the weather information. The car washing pattern may be, for example, a pattern of washing the vehicle at regular intervals regardless of the weather, a pattern of washing the vehicle within a certain period of time after rain or snow, or a pattern in which a car washing is rarely performed. However, this is merely an example, and the present disclosure is not limited thereto. The pattern determination unit 121 may transmit or otherwise provide the determined car washing pattern to the timing prediction unit 122.

The timing prediction unit 122 may determine an estimated time when the next car washing will be performed based on the car washing pattern determined by the pattern determination unit 121. For example, the timing prediction unit 122 may be provided with the car washing pattern determined by the pattern determination unit 121 and the obtained weather information. The timing prediction unit 122 may combine the determined car washing pattern and the weather information, and may then determine the estimated time when the next car washing will be performed. Based on the weather information provided by the pattern determination unit 121, the timing prediction unit 122 may determine an optimal estimated time when the next car washing will be performed according to the weekly weather, or an optimal estimated time when the next car washing will be performed according to the monthly weather. However, this is merely an example, and the present disclosure is not limited thereto. The timing prediction unit 122 may transmit or otherwise provide the information on the determined estimated time to the display determination unit 123.

The display determination unit 123 may be provided with the information on the estimated time from the timing prediction unit 122, and may provide information of interest on one or more car washing places to be displayed when the estimated time is reached. To this end, when the display determination unit 123 receives the information on the estimated time from the timing prediction unit 122, on the basis of the corresponding information, the display determination unit 123 may determine whether the vehicle reaches the estimated time.

In addition, when it is determined that the vehicle reaches the estimated time, the display determination unit 123 may cause the information on the one or more car washing places to be displayed on the vehicle. The information of interest on the car washing places may include at least one of a location information on the one or more car washing places and a discount information on a car washing fee. The discount information on the car washing fee may correspond to an advertisement information on the one or more car washing places. Accordingly, the display determination unit 123 may not only cause the location information on the car washing places to be displayed but also concurrently provide a user with the discount information on the car washing fee as advertisement information. In an embodiment, the display determination unit 123 may also determine a frequently used car washing place and the frequency of car washing based on the car washing pattern determined by the pattern determination unit 121. The pattern determination unit 121 may filter the information of interest on the one or more car washing places based on the determined frequently used car washing place and frequency of car washing, and may cause the filtered information of interest to be displayed to the user.

For example, there may be a lot of the information of interest on the car washing places. When displayed without filtering, there may be a problem that a user is provided with unnecessary information of interest. To prevent this problem, the display determination unit 123 may determine a vehicle's current location when the estimated time is reached, and may display the information of interest corresponding to the determined current location of the vehicle.

In some examples, the information of interest on the car washing places may be pre-stored in a memory (not shown) that may be separately provided in the display determination unit 123 or in the controller 120. In other examples, the information of interest on the car washing places may be provided in real-time. For example, according to an embodiment, an external server 200 may provide such information. The controller 120 and the external server 200 may, for example, periodically communicate with each other. In an embodiment, when it is determined that the estimated time is reached, the display determination unit 123 may determine the vehicle's current location and provide the information on the determined current location of the vehicle to the external server 200.

In addition, the external server 200 may perform a separate process based on the information of interest on multiple (e.g., all) car washing places stored in advance, and may then filter the information on the car washing places to only the information of interest on the car washing places corresponding to the vehicle's current location provided by the display determination unit 123. However, this is merely an example, and the present disclosure is not limited thereto. For example, the external server 200 may not store the information of interest on the car washing places in advance, but may receive the information periodically. The external server 200 may then perform a separate process based on the provided information in order to filter the information to obtain only the information of interest on the car washing places corresponding to the vehicle's current location.

In addition, the external server 200 may transmit the filtered information of interest on the car washing places back to the controller 120. The display determination unit 123 may receive the information of interest on the car washing places corresponding to the vehicle's current location from the external server 200. The controller 120 may cause the received information of interest to be displayed. For example, the display determination unit 123 may generate display information to include the information of interest on the car washing places, and may transmit the display information to the output device 130.

Referring back to FIG. 1, the output device 130 may be provided with the information of interest on the car washing places from the controller 120, and may display the information of interest to a vehicle user. For example, the output device 130 may be a display device that is provided in the vehicle in order to visually and/or aurally display the information of interest on car washing places. The output device may be implemented as a display of a cluster or an audio/video/navigation (AVN) system. However, this is merely an example, and the output device 130 may be implemented in other suitable manners.

In an example, when the output device 130 is a navigation system provided in the vehicle, the output device 130 may display the information of interest on the car washing places on the map provided in the navigation system. The location information of the car washing places may enable a brand pin of a car washing place to be displayed at a corresponding location. Also, a discount information on a car washing fee may be displayed in a pop-up form on the corresponding brand pin in conjunction with the location information on the car washing place. However, this is merely an example, and the present disclosure is not limited to the example described above.

Hereinafter, a method for providing information, according to an embodiment is described below with reference to FIG. 3. In an embodiment, the method for providing information illustrated in FIG. 3 may be implemented by the system for providing information illustrated in FIGS. 1 and 2. A detailed description of each step has been described above with reference to FIGS. 1 and 2. Thus, the detailed description has been omitted from the description of FIG. 3. For convenience of explanation, it is assumed hereinafter that each operation of the method illustrated in FIG. 3 is performed by the controller 120.

Figure 3:
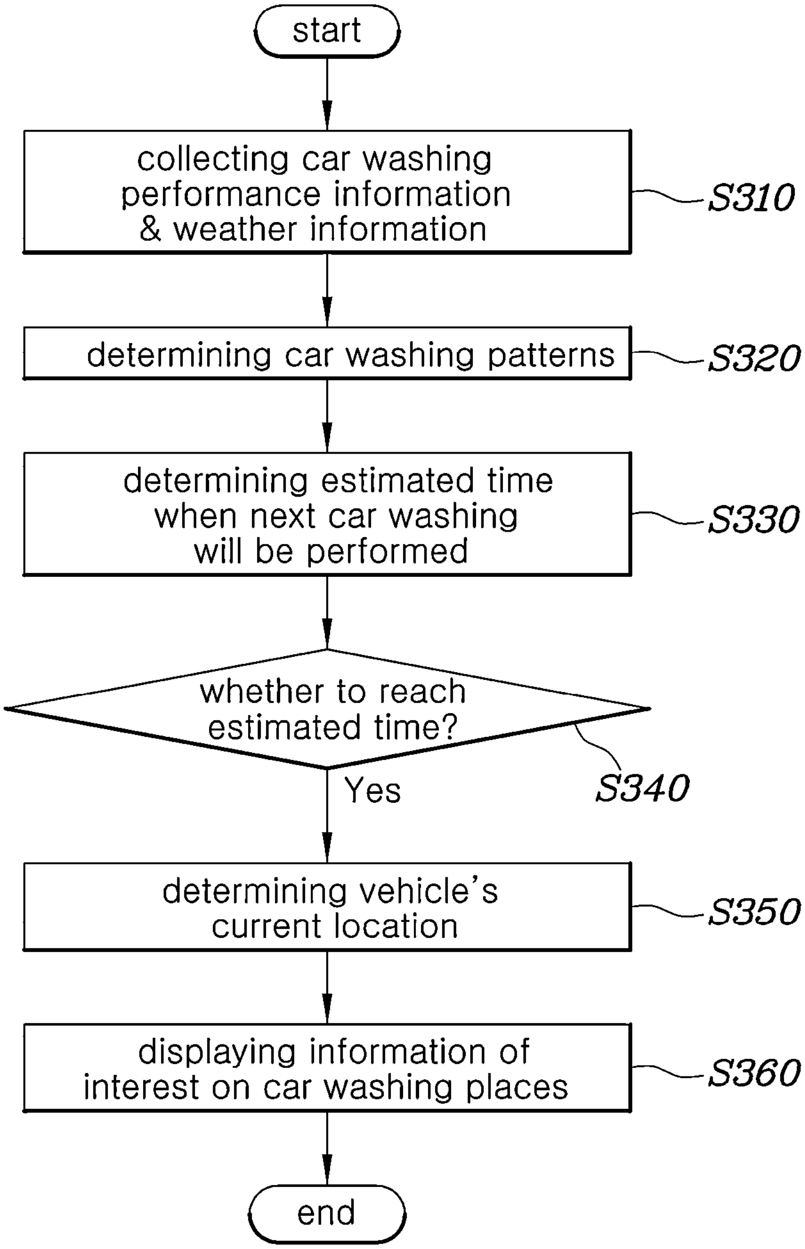
FIG. 3 is a flowchart illustrating a method for providing information, according to an embodiment of the present disclosure.

FIG. 3 is a flowchart illustrating a method for providing information, according to an embodiment of the present disclosure.

In an operation S310, the controller 120 may collect car washing performance information and weather information. For example, the controller 120 may collect the car washing performance information based on usage information of an in-vehicle payment function provided in a vehicle and/or based on sensing information of a rain sensor 110 provided in the vehicle and weather information. In an operation S320, the controller 120 may determine car washing pattern of the vehicle on the basis of the collected car washing performance information and the weather information.

In an operation S340, the controller 120 may determine an estimated time when the next car washing will be performed by combining the determined car washing pattern and the weather information. In an operation S340, the controller 120 may determine whether the determined estimated time is reached.

When the determined estimated time is reached (Yes in the operation S340), the controller 120 may perform an operation S350 to determine a vehicle's current location. In an operation S360, the controller 120 may cause the information on the car washing places corresponding to the vehicle's current location to be displayed through the output device 130. For example, the controller 120 may transmit the information on the car washing places corresponding to the vehicle's current location to the output device 130.

As described above, the system and methods of the present disclosure may provide information and advertisements tailored to the user's needs by determining a car washing pattern and displaying the information of interest on the car washing places at an estimated time when car washing is to be performed.

In addition, by determining the car washing pattern based on usage information of an in-vehicle payment function, the user's usability of the in-vehicle payment function may be improved.

The present disclosure described above may be implemented as computer-readable code on a medium where a program is recorded. Computer-readable medium may include all types of recording devices in which data readable by a computer system is stored. Examples of a computer-readable medium may include hard disk drives (HDDs), solid-state disks (SSDs), silicon disk drives (SDDs), ROMS, RAMS, CD-ROMS, magnetic tapes, floppy disks, optical data storage devices, and/or the like.

Although some embodiments of the present disclosure have been shown and described, it should be apparent to those having ordinary skill in the art that the present disclosure may be variously modified and changed without departing from the technical idea of the present disclosure defined by the following claims.

Therefore, the detailed description should not be interpreted in a limited way in all respects but should be considered as an example. The scope of the present disclosure should be determined by reasonable interpretation of the appended claims, and all changes within the equivalent scope of the present disclosure are included in the scope of the present disclosure.

What is claimed is:

1. A system included in a vehicle for providing information, the system comprising:

a rain sensor configured to sense information related to rain;

a controller configured to determine a car washing pattern based on car washing performance information of the vehicle and weather information, determine an estimated time when a next car washing will be performed based on the car washing pattern, and control the vehicle to display information of interest regarding at least one car washing place when the estimated time is reached; and an output device configured to display the information of interest, wherein the controller is configured to collect the car washing performance information of the vehicle based on one or both of i) usage information of an in-vehicle payment function provided in the vehicle or ii) sensing information of the rain sensor and the weather information, and wherein the controller is configured to determine that a car washing was performed when the rain sensor collects sensing information for more than a preset reference time when it does not rain according to the weather information.

2. The system of claim 1, wherein the controller is configured to determine the estimated time by combining the car washing pattern and the weather information.

3. The system of claim 1, wherein the information of interest includes at least one of a location information of the at least one car washing place or a discount information of a car washing fee.

4. The system of claim 3, wherein the controller is configured to:

determine a current location of the vehicle when the estimated time is reached; and provide the information of interest corresponding to the current location of the vehicle to be displayed.

5. The system of claim 4, wherein the controller is configured to:

receive the information of interest corresponding to the current location of the vehicle from an external server; and provide the information of interest, received from the external server, to be displayed.

6. A method for providing information in a vehicle, the method comprising:

sensing, by a rain sensor, information related to rain;

determining, by a controller, a car washing pattern based on car washing performance information of the vehicle and weather information;

determining, by the controller, an estimated time when a next car washing will be performed based on the car washing pattern; and controlling, by the controller, an output device provided in the vehicle to display information of interest regarding at least one car washing place when the estimated time is reached, wherein determining the car washing pattern includes collecting the car washing performance information of the vehicle based on one or both of i) usage information of an in-vehicle payment function provided in a vehicle or ii) sensing information of the rain sensor and the weather information, and wherein collecting the car washing performance information includes determining that a car washing was performed when the rain sensor collects sensing information for more than a preset reference time when it does not rain according to the weather information.

7. The method of claim 6, wherein determining the estimated time includes determining the estimated time by combining the car washing pattern and the weather information.

8. The method of claim 6, wherein the information of interest includes at least one of a location information of the at least one car washing place or a discount information of a car washing fee.

9. The method of claim 8, wherein displaying the information of interest includes:

determining, by the controller, a current location of the vehicle when the estimated time is reached; and displaying, by the output device, the information of interest corresponding to the current location of the vehicle.

10. The method of claim 9, wherein displaying the information of interest includes:

receiving, by the controller, the information of interest corresponding to the current location of the vehicle from an external server; and displaying, by the output device, the information of interest received from the external server.

* * * * *